United States Patent [19]
Müller et al.

[11] Patent Number: 5,127,506
[45] Date of Patent: Jul. 7, 1992

[54] CLUTCH ACTUATING SYSTEM

[75] Inventors: Roland Müller; Hans-Walter Riese, both of Bundesrepublik Deutschland, Fed. Rep. of Germany

[73] Assignee: Fichtel & Sachs AG, Schweinfurt, Fed. Rep. of Germany

[21] Appl. No.: 637,357

[22] Filed: Jan. 4, 1991

[30] Foreign Application Priority Data

Jan. 13, 1990 [DE] Fed. Rep. of Germany ....... 4000835

[51] Int. Cl.$^5$ .................................................. F16D 25/12
[52] U.S. Cl. ......................... 192/85 C; 192/91 A; 60/576; 60/578
[58] Field of Search .............. 192/85 C, 85 R, 91 R; 60/574, 576, 577, 578

[56] References Cited

U.S. PATENT DOCUMENTS

| | | | |
|---|---|---|---|
| 2,311,787 | 2/1943 | Swift | 60/578 |
| 2,317,601 | 4/1943 | Fowler | 60/578 |
| 2,317,604 | 4/1943 | Hamilton | 60/576 |
| 2,343,900 | 3/1944 | Groves | 60/576 |
| 2,593,192 | 4/1952 | Rockwell | 192/91 A |
| 3,261,438 | 7/1966 | Binder | 192/99 S |
| 4,372,178 | 2/1983 | Ota | 74/512 |
| 4,386,537 | 6/1983 | Lewis | 74/512 |

FOREIGN PATENT DOCUMENTS

| | | |
|---|---|---|
| 0050540 | 4/1982 | European Pat. Off. . |
| 2615986 | 10/1976 | Fed. Rep. of Germany . |
| 2055180 | 2/1981 | United Kingdom . |

Primary Examiner—Leslie A. Braun
Assistant Examiner—Nicholas Whitelaw
Attorney, Agent, or Firm—Brumbaugh, Graves, Donohue & Raymond

[57] ABSTRACT

According to an illustrative example of the invention, a foot pedal acts upon a first master cylinder and with delay upon a second master cylinder. Both master cylinders are connected with a slave cylinder which acts upon a clutch releaser. In a first range of movement adjacent the clutch engagement condition, the foot pedal acts only upon the first master cylinder such that there is a small transmission ratio between the movement of the clutch pedal and the movement of the clutch releaser. In as second range of movement subsequent to the first range of movement, the clutch pedal acts upon both master cylinders so that there is a higher transmission ratio between the movement of the clutch pedal and the movement of the releaser.

18 Claims, 4 Drawing Sheets

CLUTCH ACTUATING SYSTEM

BACKGROUND OF THE INVENTION

The present invention relates to a clutch actuating system comprising an operator's actuating element, a clutch release element and a transmission system between said actuating element and said clutch release element.

The increasing power intensity in motor vehicle constructions has the consequence that the friction clutches have to transmit even higher torques. Since in the conventional friction clutches the torque to be transmitted is generated by prestressed springs, with increasing torque the force of the spring must also rise. Thus, the actuation forces for such clutches which must compensate for the spring force grow proportionately as the torque transmission capacity increases. This results in more and more problems in the control of the friction clutch during the starting motion of the vehicle.

STATEMENT OF THE PRIOR ART

According to German Patent No. 2,615 986, the actuating force for a clutch is transmitted from the actuator's pedal to a master cylinder which is connected through a hydraulic conduit system with a slave cylinder. The slave cylinder acts on a release element of the friction clutch.

OBJECT OF THE INVENTION

It is the object of the present invention t provide a clutch actuating system in which the control of the starting motion of the respective vehicle is facilitated in spite of high spring forces of the clutch.

A further object of the present invention is to provide a clutch actuating system which is simple and economic both with regard to manufacture and operation.

SUMMARY OF THE INVENTION

A clutch actuating system comprises an operator's actuating element, a clutch release element and a transmission system between the actuating element and the clutch release element. The actuating element is movable by the operator through an overall actuating element path extending between a clutch engagement position of said actuating element and a clutch disengagement position of said actuating element. The clutch release element is movable in response to the movement of the actuating element through the overall actuating element path through an overall release element path between a clutch engagement position of the clutch release element and a clutch disengagement position of the clutch release element. The overall actuating element path and the overall release element path define a theoretical overall range transmission ratio $$T_o = \frac{\text{overall actuating element path}}{\text{overall release element path}}.$$

This transmission system has a variable transmission ratio $T_p$ along the overall release element path. The variable transmission ratio $T_p$ is defined as $$T_p = \frac{\text{actuating element path increment}}{\text{release element path increment}}$$

at the respective location along the overall release element path. The variable transmission ratio $T_p$ is smaller than the theoretical overall range transmission ratio $T_o$ in a first partial range of the overall release element path closer to the clutch disengagement position of the clutch release element is larger than the theoretical overall range transmission ratio $T_o$ in a second partial range of the overall release element path closer to the clutch engagement position. Thus, better control of the starting motion of the vehicle is obtained in the second partial range of movement.

According to a preferred embodiment of the present invention, the transition between the first partial range and the second partial range is located in an intermediate range of the overall release element path, which intermediate range extends from about 25% to about 35% of the overall release element path when starting from the clutch engagement position of the clutch release element, corresponding to from about 65% to about 75% of the overall actuating element path when starting from the clutch engagement position of the actuating element.

This invention is particularly applicable when the transmission system is a fluid-operated transmission system and more particularly when the fluid-operated transmission system is a liquid-operated transmission system.

In case of a fluid-operated and particularly of a liquid-operated clutch actuating system, a preferred construction comprises master-side cylinder piston means and slave-side cylinder piston means. The master-side cylinder piston means are engageable with the actuating element, and the slave-side cylinder piston means are engageable with the clutch release element, with fluid conduit means interconnecting said master-side cylinder piston means and said slave-side cylinder piston means The master-side cylinder piston means may comprise master-side cylinder means and master-side piston means. The master-side cylinder means and the master-side piston means are movable with respect to each other by the actuating element being moved through the overall actuating element path.

The relative movement of the master-side cylinder means and the master-side piston means causes a flow of fluid between the master-side cylinder piston means and the slave-side cylinder piston means In this embodiment, the flow of fluid per length unit of movement of the actuating element is larger within the first partial range and smaller within the second partial range.

According to a first embodiment of the present invention, the master-side piston means comprise at least two piston members.

One may choose an arrangement in which at least one of the two piston members is coupled for movement by the actuating element in response to the actual location of the actuating element along the overall actuating element path.

According to a first embodiment of this construction; the master-side cylinder piston means comprise a cylinder unit having a cylindrical bore with an axis, an annular piston member axially movable along the cylindrical bore of the cylinder unit, a further piston member axially movable within a cylindrical bore of the annular piston member, first spring means biasing the annular piston member towards a terminal position thereof with respect to the cylinder unit, second spring means biasing the further piston member towards a terminal position thereof with respect to the cylinder unit, mutually engageable abutment means on the annular piston member and the further piston member, said further piston member being movable by the actuating element away from the terminal position for providing a flow of fluid from the cylinder unit towards the slave-side cylinder piston means, said abutment becoming engaged after said further piston member has been moved through a predetermined distance such that on further movement of the actuating element the annular piston member is entrained by the further piston member and the flow of fluid is increased.

According to a further embodiment, the master-side cylinder piston means comprise a cylinder unit having a cylindrical bore with an axis, an annular piston member axially movable along the cylindrical bore of the cylinder unit, a further piston member axially movable within a cylindrical bore of the annular piston member, first spring means biasing the annular piston member towards a terminal position thereof with respect to the cylinder unit, second spring means biasing the further piston member towards a terminal position thereof with respect to the annular piston member, mutually engageable abutment means on the annular piston member and the further piston member, said actuating element acting upon the further piston member to move the further piston member and the annular piston member away from the respective terminal positions and bring the abutment means into an abutment condition against the action of the second spring means.

In this latter-mentioned embodiment, the first spring means may have a lower prestress than the second spring means such that on movement of the further piston member through a first distance away from the terminal position thereof the annular piston member is entrained by the further piston member through the second spring means against the action of the first spring means, on movement of the further piston member through a further distance away from the terminal position thereof the second spring means are compressed until the abutment means engage, and on movement of the further piston member through a still further distance away from the terminal position thereof the annular piston member is again entrained by the further piston member through the engaged abutment means against the action of the first spring means. The particular advantage of this embodiment is that the path necessary for overcoming internal clearances and elasticities can be reduced.

According to a further embodiment, the master-side cylinder piston means comprise at least two cylinder piston units, said cylinder piston units being both connected to the slave-side cylinder piston means by the fluid conduit means, said at least two cylinder piston units being successively acted upon by the actuating element.

According to a first variant of this latter-mentioned embodiment, the at least two master-side cylinder piston units are arranged side by side.

According to a second variant of the latter-mentioned embodiment, the at least two master-side cylinder piston units are arranged one behind the other, a first one of said at least two master-side cylinder piston units having a first piston rod extending through both ends of a respective cylinder, said first piston rod having a first end being acted upon by the actuating element and a second end, a second one of said at least two cylinder piston units having a second piston rod opposed to the second end of the first piston rod for being engaged by the second end of the first piston rod in response to a movement of the first piston rod through a predetermined distance.

In all embodiments, it is readily possible to vary the behavior of the clutch actuating system, more particularly it is possible to modify the location of the intermediate range in which the transition between the first partial range and the second partial range takes place. In particular, this is possible in all embodiments using several pistons by varying the location at which the respective pistons become effective.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The invention will be explained in greater detail hereinafter with reference to embodiments shown in the accompanying drawings in which.

DETAILED DESCRIPTION OF THE PREFERRED EMBODIMENTS

Figure 1:
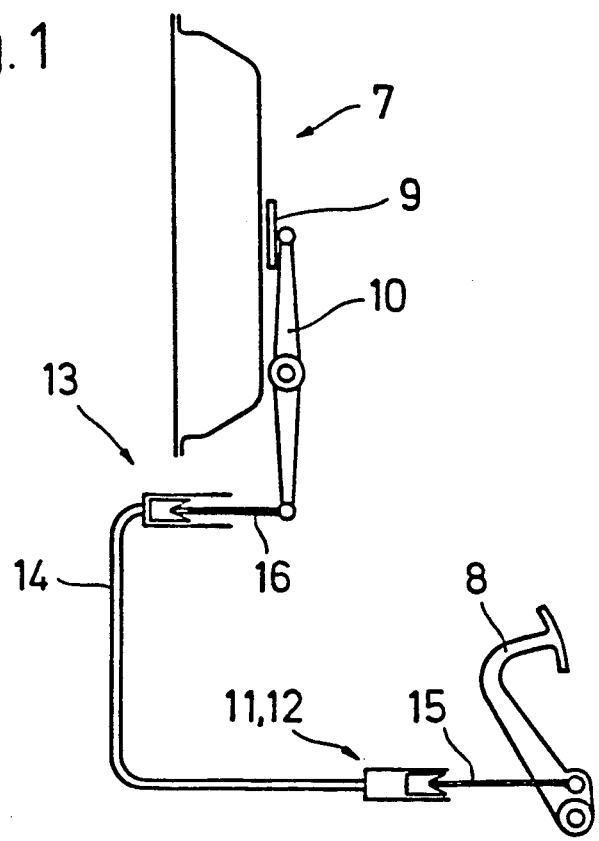
FIGURE 1 shows the principle of a hydraulic clutch actuation system.
Figure 2:
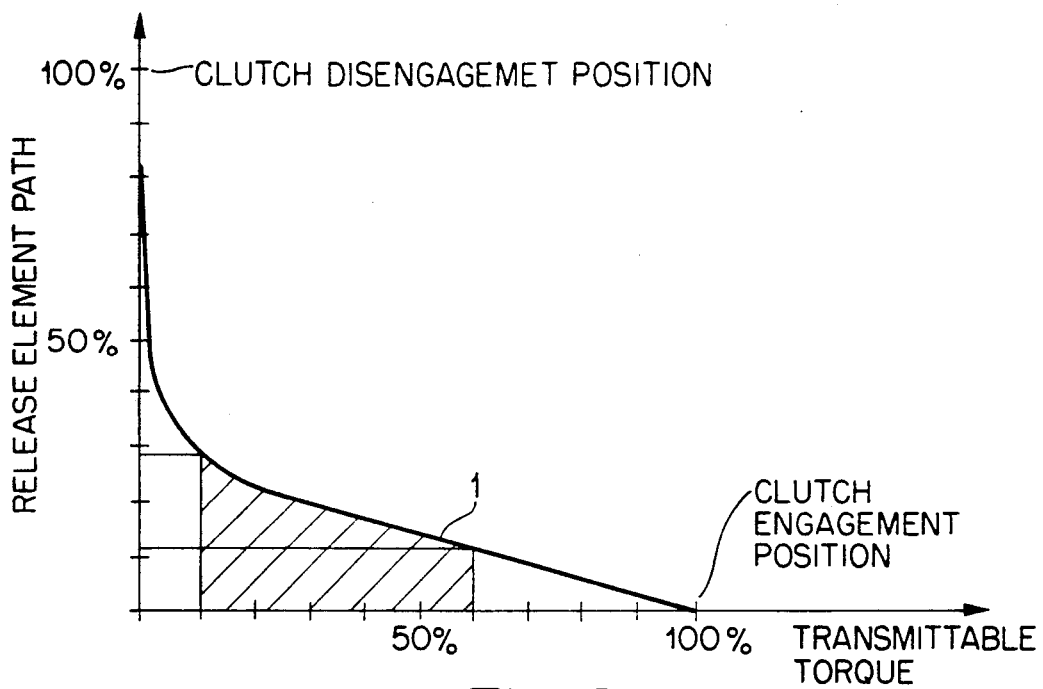
FIG. 2 shows a curve illustrating the torque build-up in a friction clutch in dependence upon the release path.

FIG. 1 shows the overall situation of a clutch actuation system with a hydraulic linkage. On a friction clutch 7, a release lever 10 is pivotably mounted, which for the one part carries a releaser 9 and for another part is in connection through a push rod 16 with a slave cylinder 13. At another location of the motor vehicle, a clutch pedal 8 is mounted rotatably about a fixed point, the clutch pedal 8 being in communication through a push rod 15 with a master cylinder device 11 or 12. From the master cylinder device to the slave cylinder device there extends a conduit 14 which is filled with a hydraulic medium. For the release of the friction clutch 7, the clutch pedal 8 is depressed, whereby the piston of the master cylinder device 11, 12 is displaced via a push rod 15. Thereafter, a quantity of fluid thus displaced flows through the conduit 14 and shifts the piston in the slave cylinder device 13. This displacement is transmitted through the push rod 16 to the release lever 10, which in turn moves the releaser 9 in such a way that the friction clutch 7 is disengaged. For the engagement of the friction clutch 7 and thus for starting movement of the motor vehicle, the clutch pedal 8 is released and the entire operation takes place in the opposite direction. The distance travelled by the push rod 16 and the releaser 9 between the clutch engagement position and the clutch disengagement position will now generally be called overall release element path. The dependence of the release element path upon the transmittable torque of the friction clutch 7 is set forth by the curve 1 in FIG. 2. Starting from the disengaged condition of the friction clutch 7 corresponding to 100% of the overall release element path according to FIG. 2, a noticeable torque transmission begins in the friction clutch at about 30 to 40% of the overall release element path. The partial path travelled until then results essentially from the clearance distance of the friction clutch, which must be made sufficiently great for a secure separation of the individual parts of the friction clutch to be able to be carried out and any torque transmission to be securely suppressed. The remaining approximately 30% of the overall release element path is responsible for the whole torque build-up in the friction clutch. In order now to be able to carry out a finely regulated movement-starting operation, it the range from about 10% to about 60 or 70% of the torque to be transmitted, to carry out a finely sensitive actuation of the releaser by means of the clutch pedal. The available pedal travel must now be used especially sensibly, since with the increase of engine torque and engine power the springs used in the friction clutches must be increasingly prestressed for the transmission of the torque.

Figure 3:
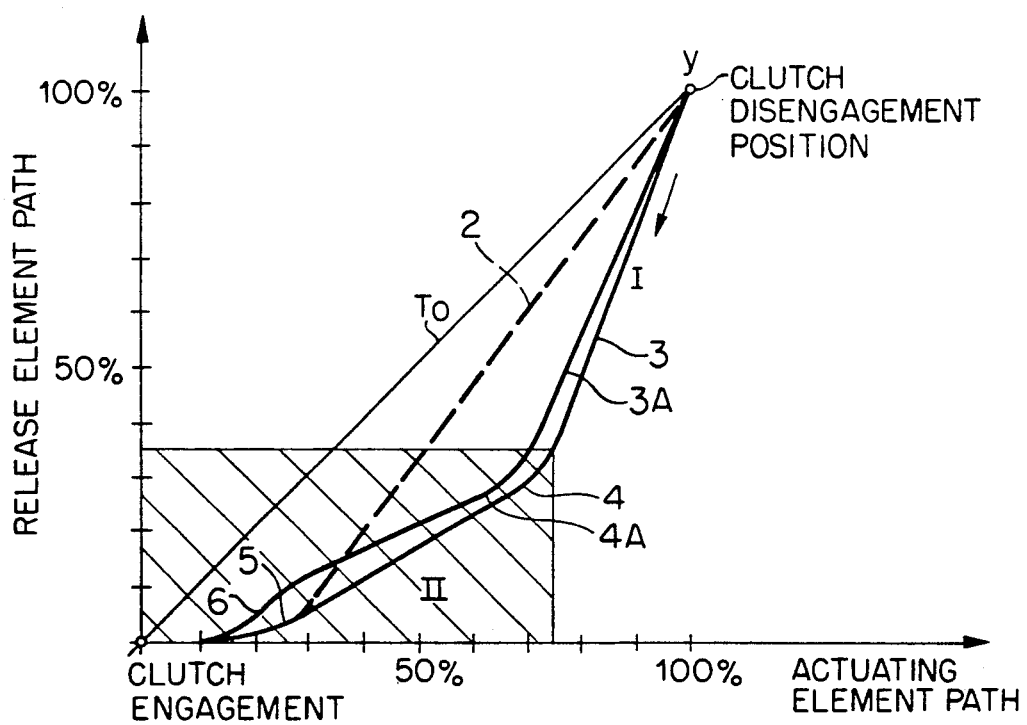
FIGURE 3 shows curves concerning the dependence of the pedal path upon the clutch release distance, including an illustration of the prior art.

In FIG. 3, three different curves are illustrated which represent the dependence between the overall actuating element path (overall pedal path) and the overall release element path (overall release path) in different systems. The curve 2 here relates to a conventional system according to FIG. 1, where a single-stage master cylinder and a single-stage slave cylinder are provided. The curve proceeds essentially in a straight line, starting from the clutch disengagement position (100% overall actuating element path, 100% overall release element path), and approaches the abscissae approximately in the region of 20% to 30% of the overall actuating element path as measured from the clutch engagement position. The curve 2 further does not pass directly through the zero point since—starting from the clutch engagement position—in the actuation of the clutch release system as all clearances and elasticities must first be overcome. As can be seen from FIG. 3, the actuating element path available for the movement starting operation in which the torque to be transmitted is increased from about 10% to about 60 or 70% is very small according to line 2. With this conventional system, a finely sensitive motion-starting operation is difficult.

The two other curves show the manner of operation according to the invention; both curve courses are composed of two partial ranges 3, 4 and 3A, 4A, respectively. Respective partial curves 3, 4 and 3A, 4A are approximately linear and define an angle in a transit range. The curve 3-4 results from the use of a two-stage master cylinder, as will subsequently be explained in greater detail with reference to FIG. 4.

A theoretical overall range transmission ratio $$T_o = \frac{\text{overall actuating element path}}{\text{overall release element path}}.$$

This ratio is defined as $T_o$ corresponds to the inclination of a connection line interconnecting the clutch engagement position x and the clutch disengagement position y in FIG. 3.

In practice, the transmission ratio is variable along the curve 3, 4. In the curve section 3, the transmission ratio of the transmission system, which is defined by $$T_p = \frac{\text{actuating element path increment}}{\text{release element path increment}}$$

is smaller than the theoretical overall range transmission ratio $T_o$, as defined by the connection line of points x and y. On the other hand, in the curve section 4, the transmission ratio $$T_p = \frac{\text{actuating element path increment}}{\text{release element path increment}}$$

is larger than the theoretical overall transmission ratio $T_o$. The transition between the curve section 3 and the curve section 4 is located at about 65 to 75% of the overall actuating element path corresponding to about 25 to 35% of the overall release element path when measured from point x.

Thus, it is ensured that in the movement-starting operation in the region of the curve section 4 a greater amount of pedal travel is available and thus the engagement of the clutch can be actuated in a finely sensitive manner. At the left-hand end, curve section 4 merges into the curve section 5 which continuously approaches the abscissae as does curve 2. The release operation then takes place in the opposite direction, i.e. opposite to the arrow inserted in FIG. 3.

Figure 4:
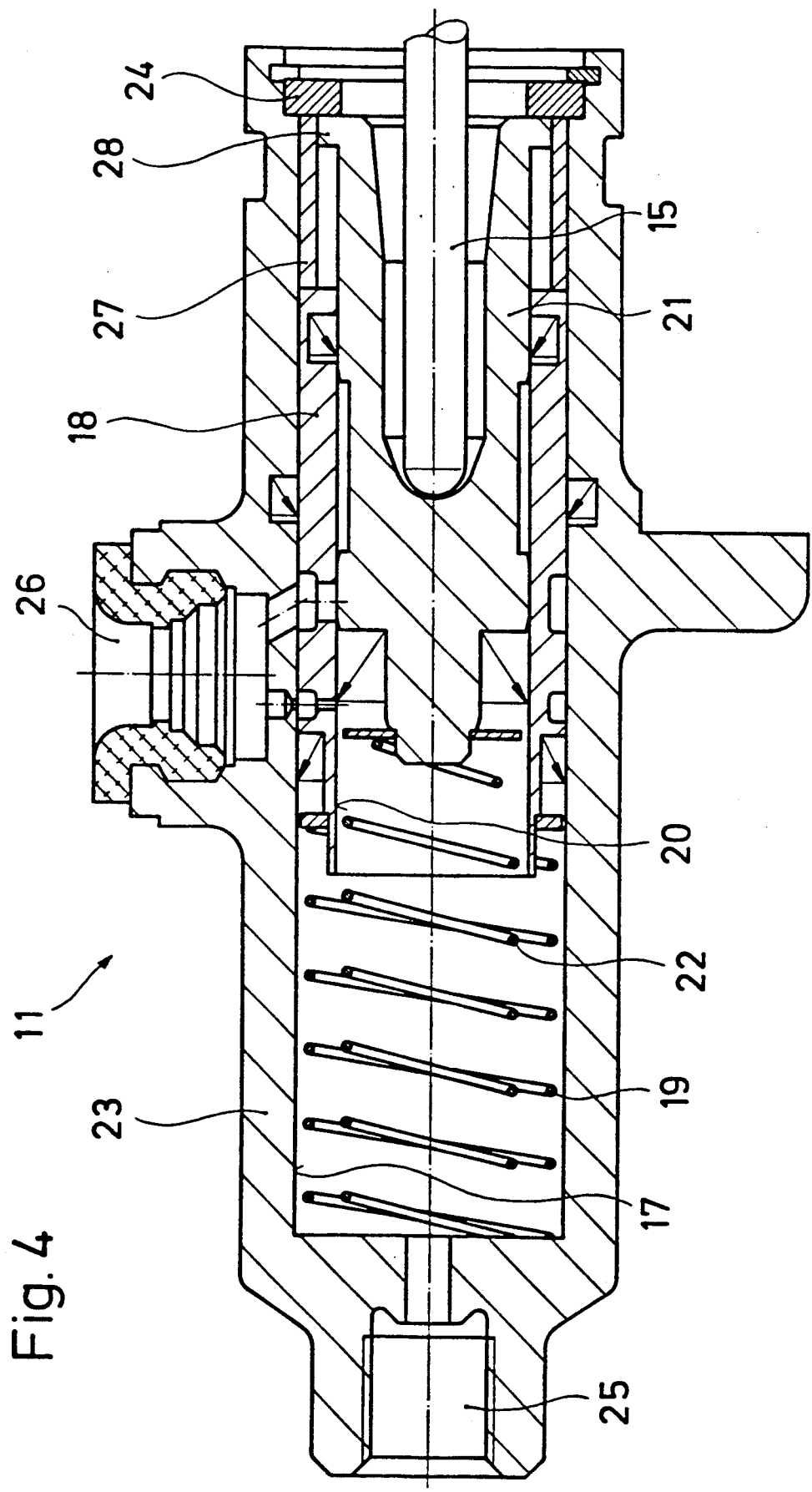
FIGURE 4 shows a master cylinder device in a two-stage formation.

In FIG. 4, the master cylinder unit is illustrated which renders possible the curve 3-4. In a housing or cylinder unit 23, an annular piston 18 is displaceably mounted in a cylindrical bore 17. In the annular piston 18, a further piston 21 is displaceably mounted in a cylindrical bore 20. Both pistons 18 and 21 are loaded, each by its own spring 19 and 22, respectively, in the direction towards their rest positions, both resting on a respective stop in the housing. The piston 21 is here supported directly on a stop 24, while the annular piston 18 is supported through a distance tube 27, which ensures a predetermined distance between the two pistons. The push rod 15 is arranged in the piston 21 and connected with the clutch release pedal or actuating element opposite to the force direction of the two springs 19 and 22. The housing 23 is connected with a connection 26 for a compensation vessel and with a connection 25 which opens into the conduit 14. The space formed between the housing 23 and the pistons 18 and 21 is provided, in a manner not further illustrated, with an air outlet device.

The master cylinder unit 11 is situated according to FIG. 4 in a position according to the clutch engagement condition of the friction clutch. For the disengagement of the clutch, the push rod 15 is moved to the left, by means of the clutch pedal, whereby the piston 21 with its relatively small displacement area is moved into the housing 23. The transmission ratio corresponds to the curve section 4 according to FIG. 3. After the piston 21 has travelled through a predetermined distance, the stop 28 arranged on the piston 21 comes to abut on the annular piston 18 and entrains this in the further inward pushing movement of the push rod 15. Thus, a larger displacement area becomes effective, corresponding to the sum of the cross-sectional area of the piston 21 and the piston 18, and the transmission ratio corresponds now to the curve section 3 in FIG. 3. In the engagement operation, the movements proceed in the opposite sequence and the annular piston 18 will first come to abut on the distance tube 27, and thereafter the piston 21 will come to abut on the stop 24. Due to this configuration, a finely sensitive movement-starting action can be realized, in accordance with the curve 3-4 according to FIG. 3, since in the region of the essential torque build-up on the friction clutch a larger transmission ratio $$T_p = \frac{\text{actuating element path increment}}{\text{release element path increment}}$$

is available (curve section 4). In this curve section, only the piston 21 is in use and the annular piston 18 is already supported on the distance tube 27.

Figure 5:
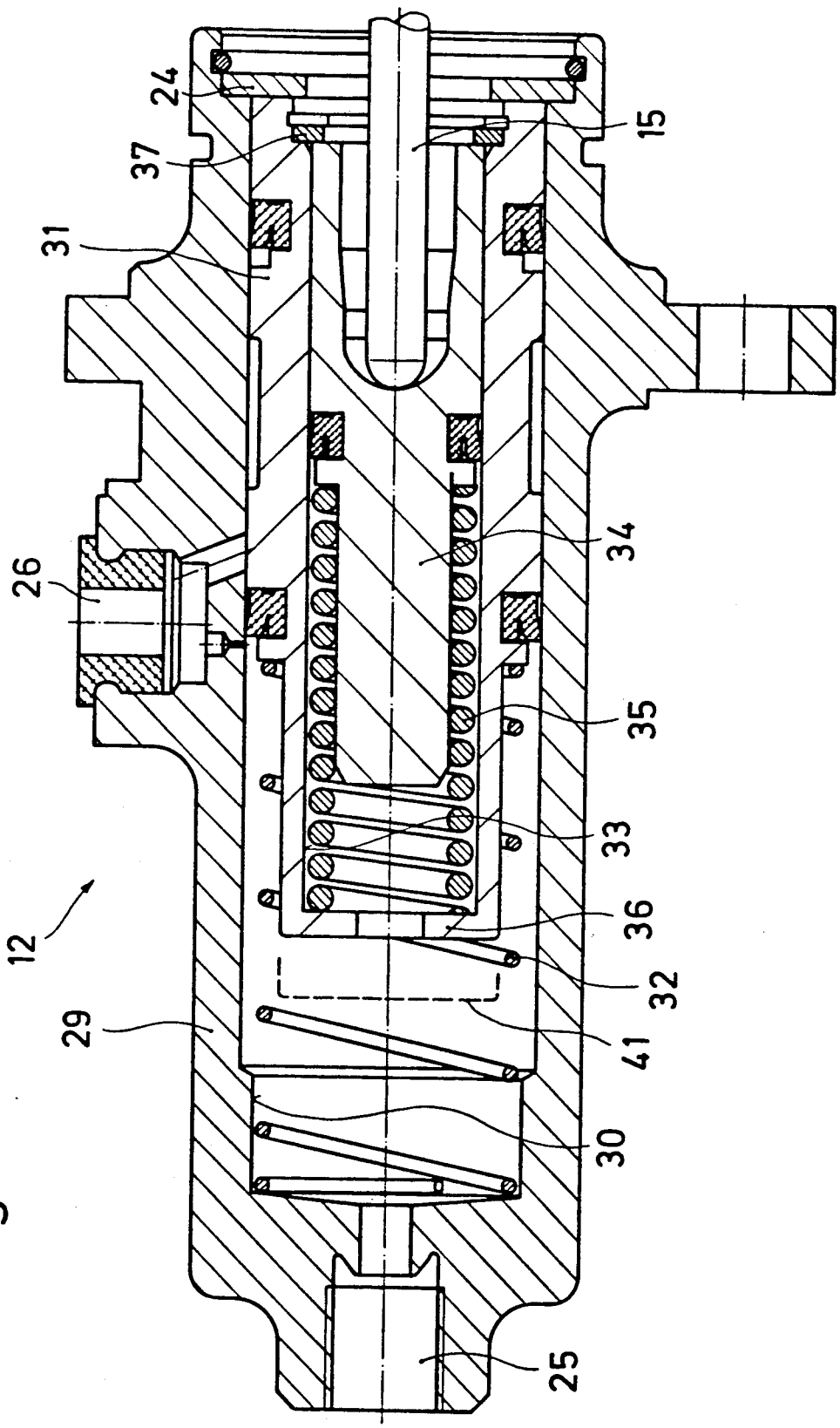
FIGURE 5 shows a master cylinder device in a three-stage formation.

FIG. 3 shows a further curve 3A, 4A, 6 which can be realized with the aid of a three-stage master cylinder unit according to FIG. 5. The master cylinder unit 12 according to FIG. 5 comprises, in a cylindrical bore of a housing or cylinder unit 29, an annular piston 31 which is guided displaceably in the bore. In a bore 33 of the annular piston 31, a further piston 34 is displaceably guided. This piston 34 is in direct connection with the push rod 15 and thus with the clutch pedal or actuating element. The annular piston 31 is loaded by a spring 32 in the direction towards its rest position, which corresponds to the clutch engagement condition of the friction clutch. The piston 34 is loaded by a spring 35 in the direction of its rest position, this spring 35 being supported for one part on the piston 34 and for the other part on an abutment 36 of the annular piston 31. The opposite end of the piston 34 is supported through a stop 37 directly on the annular piston 31. The annular piston 31 itself is supported through a stop 24 on the housing 29.

Starting from the rest position as illustrated, which corresponds to the engagement condition of the clutch, the piston 34 is charged with a disengagement force through the clutch pedal and the push rod 15. Due to a flatter spring characteristic curve of the spring 32 and a slighter prestress in contrast to the spring 35, a common movement of the piston 34 and of the annular piston 31 takes place, whereby, after a very short displacement distance, the clearances and elasticities present in the whole system are diminished. Thus, in accordance with the curve section 6 according to FIG. 3, it is possible to achieve superior behavior than in accordance with the curve section 5. When the annular piston 31 together with the piston 34 reaches a position according to 41 in FIG. 5, due to the pressure build-up in the hydraulic system in combination with the springs, a halting of the annular piston 31 is achieved, so that thenceforth only the piston 34 can still move with respect to the annular piston 31. The further movement of the piston 34 is now represented by the curve section 4A. This has a very flat profile according to the small effective cross-sectional area of the piston 34. This flat curve section 4A lies in the region of the overall release element path which effects the greatest torque build-up in the friction clutch, whereby a very finely sensitive actuation of the clutch is possible (this fine sensitivity is of course needed only during the engagement operation, i.e. during the movement-starting operation). The piston 34 finally comes to abut on the abutment 36 of the annular piston 31 and from this moment onwards again both pistons 31 and 34 move together into the end position, corresponding to the disengaged condition of the clutch. This latter distance corresponds to the curve 3 A, which again has a relatively steep inclination. Due to this three-stage behavior of the master cylinder unit 12 on the one hand a very flat curve section 4 A is achieved and on the other hand a steep curve section 3 A, which however still proceeds less steeply than the curve section 3. The action as just described proceeds in the opposite sequence in the engagement of the clutch.

Figure 6:
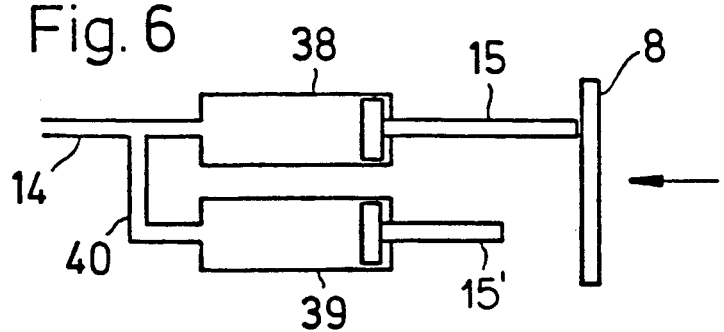
FIGURE 6 the arrangement of two parallel master cylinder units.
Figure 7:
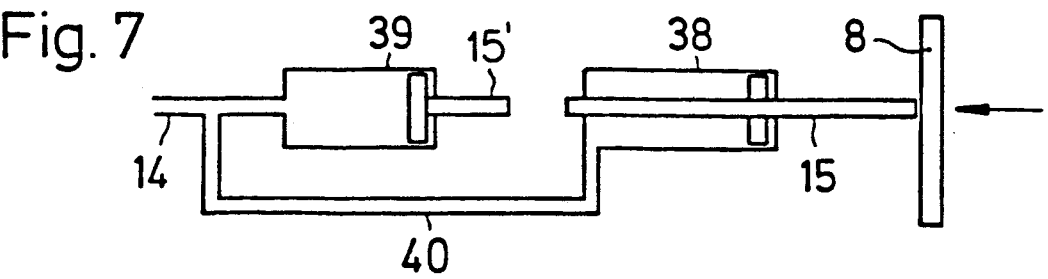
FIG. 7 shows the arrangement of two master cylinder units arranged on behind the other.

In FIGS. 6 and 7, a further possibility is illustrated of influencing the transmission ratio of pedal path to release path by a simple construction. In FIG. 6, it is illustrated how two master cylinder units 38 and 39 arranged parallel with one another come successively into use by means of a common clutch pedal 8. The push rods 15 and 15' of the two master cylinder units are made of unequal lengths, so that the clutch pedal successively actuates firstly the push rod 15 and then additionally the push rod 15'. The two master cylinder units 38 and 39 are both connected with the common conduit 14 to the slave cylinder unit 13. With the arrangement as represented, it is possible to achieve a curve corresponding to 3-4 according to FIG. 3. Starting from the engaged position first a relatively small quantity of fluid is displaced by means of the one master cylinder unit 38, and then a relatively large quantity by the combination of the master cylinder units 38 and 39.

The same effect is achieved according to an arrangement in accordance with FIG. 7, in which the two master cylinder units 38 and 39 are arranged in alignment one behind the other. The push rod 15 of the master cylinder unit 38 is guided through the latter and in the rest position has a spacing from the push rod 15' of the master cylinder unit 39 lying therebehind. Here again, the clutch pedal 8 first actuates the one master cylinder unit 38, and then the second master cylinder unit 39 after travelling a predetermined distance. The two output sides of the master cylinder units are connected through a connecting conduit 40 with the conduit 14.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no mean restrictive.

What is claimed is:

1. A clutch actuating system comprising an operator's actuating element (8), a clutch release element (9) and a transmission system between said actuating element (8) and said clutch release element (9), said actuating element (8) being movable by the operator through an overall actuating element path extending between a clutch engagement position of said actuating element (8) and a clutch disengagement position of said actuating element (8), said clutch release element (9) being movable, in response to the movement of said actuating element (8) through said overall actuating element path, through an overall release element path between a clutch engagement position of said clutch release element and a clutch disengagement position of said clutch release element, said overall actuating element path and said overall release element path defining a theoretical overall range transmission ratio $$T_o = \frac{\text{overall actuating element path}}{\text{overall release element path}},$$

said transmission system having a variable transmission ratio $T_p$ along said overall release element path, said variable transmission ration $T_p$ being defined as $$T_p = \frac{\text{actuating element path increment}}{\text{release element path increment}}$$

at the respective location along said overall release element path, said variable transmission ratio $T_p$ being smaller than said theoretical overall range transmission ratio $T_o$ in a first partial range (3,3A) of said overall release element path closer to said clutch disengagement position y of said clutch release element (9) and being larger than said theoretical overall range transmission ratio $T_o$ in a second partial range (4,4A) of said overall release element path closer to said clutch engagement position x, said transmission system being a fluid-operated transmission system, said fluid-operated transmission system comprising a master-side cylinder piston means (11,12) and a slave-side cylinder piston means (13), said master-side cylinder piston means (11,12) being engageable with said actuating element (8) and said slave-side cylinder piston means (13) being engageable with said clutch release element (9), fluid conduit means (14) interconnecting said master-side cylinder piston means (11,12) and said slave-side cylinder piston means (13), said master-side cylinder piston means (11,12) comprising master-side cylinder means and master-side piston means, said master-side cylinder means and said master-side piston means being movable with respect to each other by said actuating element (8) being moved through said overall actuating element path, said relative movement of said master-side cylinder means and said master-side piston means causing a flow of fluid between said master-side cylinder piston means (11.12) and said slave-side cylinder piston means (13), said flow of fluid per length unit of movement of said actuating element (8) being larger within said first partial range (3,3A) and smaller within said second partial range (4,4A), said master-side cylinder piston means comprising at least two cylinder piston units (38,39), said cylinder piston units (38,39) being both connected to said slave-side cylinder piston means (13) by said fluid conduit means (14), said at least two cylinder piston units (38,39) being successively acted upon by said actuating element (8).

2. A clutch actuating system comprising an operator's actuating element (8), a clutch release element (9) and a transmission system between said actuating element (8) and said clutch release element (9), said actuating element (8) being movable by the operator through an overall actuating element path extending between a clutch engagement position of said actuating element (8) and a clutch disengagement position of said actuating element (8), said clutch release element (9) being movable, in response to the movement of said actuating element (8) through said overall actuating element path, through an overall release element path between a clutch engagement position of said clutch release element and a clutch disengagement position of said clutch release element, said overall actuating element path and said overall release element path defining a theoretical overall range transmission ratio $$T_o = \frac{\text{overall actuating element path}}{\text{overall release element path}},$$

said transmission system having a variable transmission ratio $T_p$ along said overall release element path, said variable transmission ratio $T_p$ being defined as $$T_p = \frac{\text{actuating element path increment}}{\text{release element path increment}}$$

at the respective location along said overall release element path, said variable transmission ratio $T_p$ being smaller than said theoretical overall range transmission ratio $T_o$ in a first partial range (3,3A) of said overall release element path closer to said clutch disengagement position y of said clutch release element (9) and being larger than said theoretical overall range transmission ratio $T_o$ in a second partial range (4,4A) of said overall release element path closer to said clutch engagement position x, said transmission system being a fluid-operated transmission system, said fluid-operated transmission system comprising a master-side cylinder piston means (11,12) and a slave-side cylinder piston means (13), said master-side cylinder piston means (11,12) being engageable with said actuating element (8) and said slave-side cylinder piston means (13) being engageable with said clutch release element (9), fluid conduit means (14) interconnecting said master-side cylinder piston means (11,12) and said slave-side cylinder piston means (13), said master-side cylinder piston means (11,12) comprising master-side cylinder means and master-side piston means, said master-side cylinder means and said master-side piston means being movable with respect to each other by said actuating element (8) being moved through said overall actuating element path, said relative movement of said master-side cylinder means and said master-side piston means causing a flow of fluid between said master-side cylinder piston means (11,12) and said slave-side cylinder piston means (13), said flow of fluid per length unit of movement of said actuating element (8) being larger within said first partial range (3,3A) and smaller within said second partial range (4,4A), said master-side cylinder piston means (11) comprising a cylinder unit (23) having a cylindrical bore (17) with an axis, an annular piston member (18) axially movable along said cylindrical bore (17) of said cylinder unit (23), a further piston member (21) axially movable within a cylindrical bore (20) of said annular piston member (18), first spring means (19) biasing said annular piston member (18) towards a terminal position thereof with respect to said cylinder unit (23), second spring means (22) biasing said further piston member (21) towards a terminal position thereof with respect to said cylinder unit (23), mutually engageable abutment means (28) on said annular piston member (18) and said further piston member (21), said further piston member (21) being movable by said actuating element (8) away from said terminal position for providing a flow of fluid from said cylinder unit (21) towards said slave-side cylinder piston means (13), said abutment means (28) becoming engaged after said further piston member (21) has been moved through a predetermined distance such that on further movement of said actuating element (8) said annular piston member (18) is entrained by said further piston member (21) and said flow of fluid is increased, said master-side cylinder piston means (12) comprising a cylinder unit (29) having a cylindrical bore with an axis, an annular piston member (31) axially movable along said cylindrical bore of said cylinder unit (29), a further piston member (34) axially movable within a cylindrical bore (33) of said annular piston member (31), first spring means (32) biasing said annular piston member (31) towards a terminal position thereof with respect to said cylinder unit (29), second spring means (35) biasing said further piston member (34) towards a terminal position thereof with respect to said annular piston member (31), mutually engageable abutment means (36) on said annular piston member (31) and said further piston member (34), said actuating element (8) acting onto said further piston member (34) for moving said further piston member (34) and said annular piston member (31) away from the respective terminal positions and bringing said abutment means (36) into an abutment condition against the action of said second spring means (35), said first spring means (32) having a lower prestress than said second spring means (35) such that on movement of said further piston member (34) through a first distance away from the terminal position thereof said annular piston member (31) is entrained by said further piston member (34) through said second spring means (35) against the action of said first spring means (32), on movement of said further piston member (34) through a further distance away from the terminal position thereof said second spring means (35) are compressed until said abutment means (36) come into engagement, and on movement of said further piston member (34) through a still further distance away from the terminal position thereof said annular piston member (31) is again entrained by said further piston members (34) through said engaged abutment means (36) against the action of said first spring means (32).

3. A clutch actuating system comprising an operator's actuating element (8), a clutch release element (9) and a transmission system between said actuating element (8) and said clutch release element (9), said actuating element (8) being movable by the operator through an overall actuating element path extending between a clutch engagement position of said actuating element (8) and a clutch disengagement position of said actuating element (8), said clutch release element (9) being movable, in response to the movement of said actuating element (8) through said overall actuating element path, through an overall release element path between a clutch engagement position of said clutch release element and a clutch disengagement position of said clutch release element, said overall actuating element path and said overall release element path defining a theoretical overall range transmission ratio $$T_o = \frac{\text{overall actuating element path}}{\text{overall release element path}},$$

said transmission system having a variable transmission ratio $T_p$ along said overall release element path, said variable transmission ratio $T_p$ being defined as $$T_p = \frac{\text{actuating element path increment}}{\text{release element path increment}}$$

at the respective location along said overall release element path, said variable transmission ratio $T_p$ being smaller than said theoretical overall range transmission ratio $T_o$ in a first partial range (3,3A) of said overall release element path closer to said clutch disengagement position y of said clutch release element (9) and being larger than said theoretical overall range transmission ratio $T_o$ in a second partial range (4,4A) of said overall release element path closer to said clutch engagement position x, said transmission system being a fluid-operated transmission system, said fluid-operated transmission system comprising a master-side cylinder piston means (11,12) and a slave-side cylinder piston means (13), said master-side cylinder piston means (11,12) being engageable with said actuating element (8) and said slave-side cylinder piston means (13) being engageable with said clutch release element (9), fluid conduit means (14) interconnecting said master-side cylinder piston means (11,12) and said slave-side cylinder piston means (13), said master-side cylinder piston means (11,12) comprising master-side cylinder means and master-side piston means, said master-side cylinder means and said master-side piston means being movable with respect to each other by said actuating element (8) being moved through said overall actuating element path, said relative movement of said master-side cylinder means and said master-side piston means causing a flow of fluid between said master-side cylinder piston means (11,12) and said slave-side cylinder piston means (13), said flow of fluid per length unit of movement of said actuating element (8) being larger within said first parallel range (3,3A) and smaller within said second partial range (4,4A), said master-side cylinder piston means comprising at least two cylinder piston units (38,39), said cylinder piston units (38,39) being both connected to said slave-side cylinder piston means (13) by said fluid conduit means (14), said at least two cylinder piston units (38,39) being successively acted upon by said actuating element (8).

4. A clutch actuating system as set forth in claim 3, said at least two master—side cylinder piston units (38, 39) being arranged side by side.

5. A clutch actuating system comprising an operator's actuating element (8), a clutch release element (9) and a transmission system between said actuating element (8) and said clutch release element (9), said actuating element (8) being movable by the operator through an overall actuating element path extending between a clutch engagement position of said actuating element (8) and a clutch disengagement position of said actuating element (8), said clutch release element (9) being movable, in response to the movement of said actuating element (8) through said overall actuating element path, through an overall release element path between a clutch engagement position of said clutch release element and a clutch disengagement position of said clutch release element, said overall actuating element path and said overall release element path defining a theoretical overall range transmission ratio $$T_o = \frac{\text{overall actuating element path}}{\text{overall release element path}},$$

said transmission system having a variable transmission ratio $T_p$ along said overall release element path, said variable transmission ratio $T_p$ being defined as $$T_p = \frac{\text{actuating element path increment}}{\text{release element path increment}}$$

at the respective location along said overall release element path, said variable transmission ratio $T_p$ being smaller than said theoretical overall range transmission ratio $T_o$ in a first partial range (3,3A) of said overall release element path closer to said clutch disengagement position y of said clutch release element (9) and being larger than said theoretical overall range transmission ratio $T_o$ in a second partial range (4,4A) of said overall release element path closer to said clutch engagement position x, the transition between said first partial range (3,3A) and said second partial range (4,4A) being located in an intermediate range of said overall release element path, said intermediate range extending from about 25% to about 35% of said overall release element path when starting from said clutch engagement position x of said clutch release element (9), corresponding to from about 65% to about 75% of said overall actuating element path when starting from said clutch engagement position x of said actuating element (8).

6. A clutch actuating system comprising an operator's actuating element (8), a clutch release element (9) and a transmission system between said actuating element (8) and said clutch release element (9), said actuating element (8) being movable by the operator through an overall actuating element path extending between a clutch engagement position of said actuating element (8) and a clutch disengagement position of said actuating element (8), said clutch release element (8) being movable, in response to the movement of said actuating element (8) through said overall actuating element path, through an overall release element path between a clutch engagement position of said clutch release element and a clutch disengagement position of said clutch release element, said clutch engagement position of said actuating element (8) being a rest position of said actuating element (8) existing, when the operator applies no actuating force to said actuating element (8), said clutch disengagement position of said actuating element (8) being a terminal position obtainable by said operator moving said actuating element (8) against a resilient return force, said overall actuating element path and said overall release element path defining a theoretical overall range transmission ratio $$T_o = \frac{\text{overall actuating element path}}{\text{overall release element path}},$$

said transmission system having a variable transmission ratio $T_p$ along said overall release element path, said variable transmission ratio $T_p$ being defined as $$T_p = \frac{\text{actuating element path increment}}{\text{release element path increment}}$$

at the respective location along said overall release element path, said variable transmission ratio $T_p$ being smaller than said theoretical overall range transmission ratio $T_o$ in a first partial range (3,3A) of said overall release element path closer to said clutch disengagement position y of said clutch release element (9) and being larger than said theoretical overall range transmission $T_o$ in a second partial range (4,4A) of said overall release element path closer to said clutch engagement position x and corresponding to said rest position of said actuating element (8).

7. A clutch actuating system as set forth in claim 6, the transition between said first partial range (3,3A) and said second partial range (4,4A) being located in an intermediate range of said overall release element path, said intermediate range extending from about 25% to about 35% of said overall release element path when starting from said clutch engagement position x of said clutch release element (9), corresponding to from about 65% to about 75% of said overall actuating element path when starting from said clutch engagement position x of said actuating element (8).

8. A clutch, actuating system as set forth in claim 5 or 6, said transmission system being a fluid-operated transmission system.

9. A clutch actuating system as set forth in claim 3, said fluid-operated transmission system being a liquid-operated transmission system.

10. A clutch actuating system as set forth in claim 8 said fluid-operated transmission system comprising a master-side cylinder piston means (11,12) and a slave-side cylinder piston means (13), said master-side cylinder piston means (11,12) being engageable with said actuating element (8) and said slave-side cylinder piston means (13) being engageable with said clutch release element (9), fluid conduit means (14) interconnecting said master-side cylinder piston means (11,12) and said slave-side cylinder piston means (13).

11. A clutch actuating system as set forth in claim 10, said master-side cylinder piston means (11,12) comprising master-side cylinder means and master-side piston means, said master-side cylinder means and said master-side piston means being movable with respect to each other by said actuating element (8) being moved through said overall actuating element path, said relative movement of said master-side cylinder means and said master-side piston means causing a flow of fluid between said master-side cylinder piston means (11,12) and said slave-side cylinder piston means (13), said flow of fluid per length unit of movement of said actuating element (8) being larger within said first partial range (3,3A) and smaller within said second partial range (4,4A).

12. A clutch actuating system as set forth in claim 11, said master-side piston means comprising at least two piston members, at least one of said two piston members being coupled for movement by said actuating element (8) in response to the actual location of said actuating element (8) along said overall actuating element path.

13. A clutch actuating system as set forth in claim 11 said master-side cylinder piston means (11) comprising a cylinder unit (23) having a cylindrical bore (17) with an axis, an annular piston member (18) axially movable along said cylindrical bore (17) of said cylinder unit (23), a further piston member (21) axially movable within a cylindrical bore (20) of said annular piston member (18), first spring means (19) biasing said annular piston member (18) towards a terminal position thereof with respect to said cylinder unit (23), second spring means (22) biasing said further piston member (21) towards a terminal position thereof with respect to said cylinder unit (23), mutually engageable abutment means (28) on said annular piston member (18) and said further piston member (21), said further piston member (21) being movable by said actuating element (8) away from said terminal position for providing a flow of fluid from said cylinder unit (23) towards said slave-side cylinder piston means (13), said abutment means (28) becoming engaged after said further piston member (21) has been moved through a predetermined distance such that on further movement of said actuating element (8) said annular piston member (18) is entrained by said further piston member (21) and said flow of fluid is increased.

14. A clutch actuating system as set forth in claim 11 said master-side cylinder piston means (12) comprising a cylinder unit (29) having a cylindrical bore with an axis, an annular piston member (31) axially movable along said cylindrical bore of said cylinder unit (29), a further piston member (34) axially movable within a cylindrical bore (33) of said annular piston member (31), first spring means (32) biasing said annular piston member (31) towards a terminal position thereof with respect to said cylinder unit (29), second spring means (35) biasing said further piston member (34) towards a terminal position thereof with respect to said annular piston member (31), mutually engageable abutment means (36) on said annular piston member (31) and said further piston member (34), said actuating element (8) acting onto said further piston member (34) for moving said further piston member (34) and said annular piston member (31) away from the respective terminal positions and bringing said abutment means (36) into an abutment condition against the action of said second spring means (35).

15. A clutch actuating system as set forth in claim 14, said first spring means (32) having a lower prestress than said second spring means (35) such that on movement of said further piston member (34) through a first distance away from the terminal position thereof said annular piston member (31) is entrained by said further piston member (34) through said second spring means (35) against the action of said first spring means (32), on movement of said further piston member (34) through a further distance away from the terminal position thereof said second spring means (35) are compressed until said abutment means (36) come into engagement, and on movement of said further piston member (34) through a still further distance away from the terminal position thereof said annular piston member (31) is again entrained by said further piston members (34) through said engaged abutment means (36) against the action of said first spring means (32).

16. A clutch actuating system as set forth in claim 11, said master-side cylinder piston means comprising at least two cylinder piston units (38,39), said cylinder piston units (38,39) being both connected to said slave-side cylinder piston means (13) by said fluid conduit means (14), said at least two cylinder piston units (38,39) being successively acted upon by said actuating element (8).

17. A clutch actuating system as set forth in claim 16, said at least two master-side cylinder piston units (38,39) being arranged side by side.

18. A clutch actuating system as set forth in claim 16, said at least two master-side cylinder piston units (38,39) being arranged one behind the other, a first one (38) of said at least two master-side cylinder piston units (38,39) having a first piston rod (15) extending through both ends of a respective cylinder, said first piston rod (15) having a first end being acted upon by said actuating element (8) and a second end, a second one (39) of said at least two cylinder piston units (38,39) having a second piston rod (15') opposed to said second end of said first piston rod (15) for being engaged by said second end of said first piston rod (15) in response to a movement of said first piston rod (15) through a predetermined distance.

* * * * *

UNITED STATES PATENT AND TRADEMARK OFFICE
CERTIFICATE OF CORRECTION

PATENT NO. : 5,127,506

DATED : July 7, 1992

INVENTOR(S) : Roland Muller and Hans-Walter Riese

It is certified that error appears in the above-identified patent and that said Letters Patent is hereby corrected as shown below:

ON THE TITLE PAGE

Item 75, "both of Bundesrepublik Deutschland" should read --of Geldersheim and Schwebheim, respectively, both of--;
First Page, 5th-from-bottom line of Abstract, "In as" should read --In a--;
Col.1, line 17, "proportionately" should read --proportionally--;
Col.1, line 31, "t provide" should read --to provide--;
Col.4, line 36, "FIGURE 6" should read --FIGURE 6 shows--;
Col.5, line 18, "it" should read --it is especially important for the driver to be able, in--;
Col.5, line 57, "ratio" should read --ratio is defined as--;
Col.5, line 62, "ratio is defined as" should read --ratio--;
Col.8, line 68, "ration" should read --ratio--;
Col.12, line 19, "parallel" should read --partial--;
Col.14, line 1, "clutch, actuating" should read --clutch actuating--;
Col.14, line 4, "claim 3" should read --claim 8--.

Signed and Sealed this

Twenty-first Day of September, 1993

Attest:

BRUCE LEHMAN

*Attesting Officer*     *Commissioner of Patents and Trademarks*